United States Patent [19]

Kunz

[11] 4,429,757

[45] Feb. 7, 1984

[54] WEIGHING APPARATUS INCLUDING A SECTIONAL YOKE MEMBER

[75] Inventor: Peter Kunz, Gossau, Switzerland

[73] Assignee: Mettler Instrumente AG, Greifensee, Switzerland

[21] Appl. No.: 361,360

[22] Filed: Mar. 23, 1982

[30] Foreign Application Priority Data

Jun. 2, 1981 [CH] Switzerland .................... 3739/81

[51] Int. Cl.³ .................... G01G 7/00; G01G 23/48
[52] U.S. Cl. .................... 177/212; 177/210 EM; 177/DIG. 5
[58] Field of Search ............. 177/212, 229, 210 EM, 177/DIG. 5

[56] References Cited

U.S. PATENT DOCUMENTS

| | | | |
|---|---|---|---|
| 3,786,678 | 1/1974 | Kunz | 177/212 X |
| 3,789,937 | 2/1974 | Strobel | 177/210 |
| 4,043,415 | 8/1977 | Luchinger | 177/229 X |
| 4,062,417 | 12/1977 | Kunz | 177/212 |
| 4,090,575 | 5/1978 | Kunz | 177/212 X |
| 4,109,738 | 8/1978 | Kunz | 177/212 |
| 4,311,202 | 1/1982 | Kunz | 177/212 |
| 4,337,838 | 7/1982 | Kunz | 177/212 |
| 4,373,596 | 2/1983 | Kunz | 177/212 |

*Primary Examiner*—Joseph W. Hartary
*Attorney, Agent, or Firm*—Laubscher, Fhilpitt & Laubscher

[57] ABSTRACT

A weighing apparatus of the electromagnetic load compensation type is disclosed, including a housing, a load receiver connected for vertical movement relative to the housing, a permanent magnet system connected with the housing for establishing a permanent magnetic field, and an electromagnetic compensating system including a compensation coil connected with the load receiver for movement within the magnetic field. The invention is characterized in that—in order to simplify manufacture and assembly while also achieving low structural height-the permanent magnet system includes a hollow sectional open-ended soft iron yoke member having a generally rectangular cross-sectional configuration, which yoke member is formed from a pair of longitudinally extending generally identical sections. At least one flat permanent magnet is mounted on the inner surface of the yoke member for establishing a flux path therein to generate the magnetic field.

6 Claims, 6 Drawing Figures

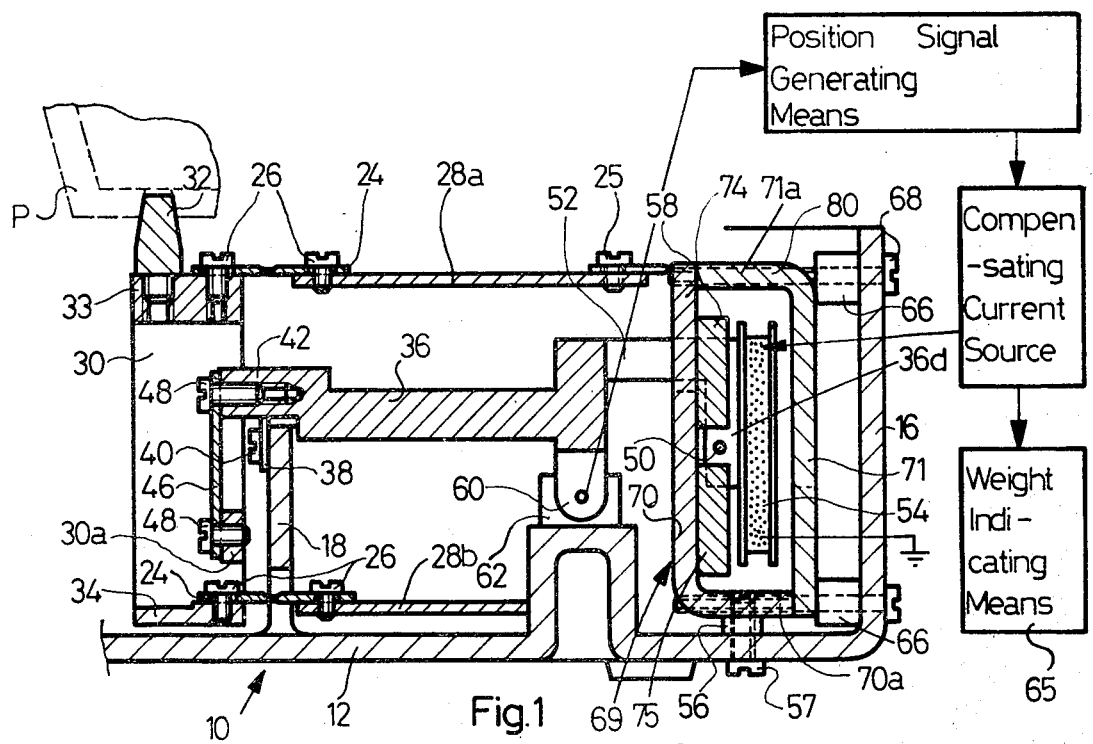
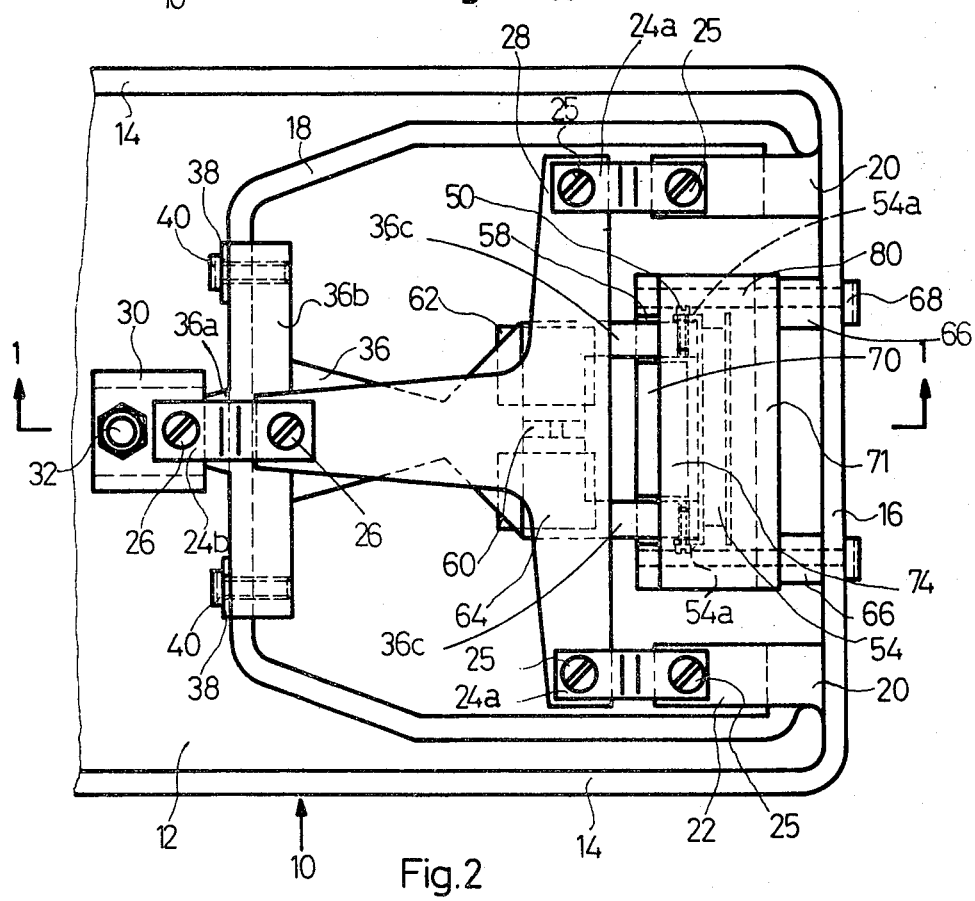

WEIGHING APPARATUS INCLUDING A SECTIONAL YOKE MEMBER

BRIEF DESCRIPTION OF THE PRIOR ART

Weighing systems of the electromagnetic load compensation type are well known in the patented prior art, as evidenced, for example, by the prior U.S. patents to Kunz Nos. 3,786,678, 4,062,417, 4,090,575 and 4,109,738, Strobel et al No. 3,789,937, and Luchinger No. 4,043,415, among others. Such weighing systems normally include a load carrier connected for movement within a housing, a stationary permanent magnet system defining a magnetic field, a load compensation coil connected with the load carrier for movement in the magnetic field, position responsive means operable upon displacement of the load carrier from a no-load position for supplying compensating current to the compensation coil to return the coil and the load carrier to its initial no-load position, and indicator means for indicating the magnitude of the applied load as a function of the level of the compensating current.

In known scales of this kind, the permanent magnet system normally comprises an upright, rectangular box which is closed off with a yoke plate, a disc-shaped permanent magnet, and space for receiving the compensation coil.

The present invention was developed, in addition to guaranteeing the most compact design possible, to simplify the manufacture and assembly of the structural components of such electromagnetic load compensation weighing systems.

SUMMARY OF THE INVENTION

In accordance with a primary object of the present invention, a permanent magnet system is provided including a soft iron yoke member in the form of an essentially rectangular, partly open-ended box for receiving at least one flat permanent magnet, whereby the box is constituted by two generally identical sections. Because the box remains partly open, certain advantages are provided, such as temperature balance during the operation of the scale, simpler handling and accessibility during assembly, and finally, as a consequence of the use of like parts, there is a reduction in the number of different structural components required.

According to a more specific object of the invention, the yoke member consists of a pair of longitudinally extending L-shaped sections mutually arranged in facing leg-to-stem relation to define a hollow rectangular cross-sectional configuration. In one embodiment, the hollow open-ended yoke member is arranged with its longitudinal axis extending horizontally, the leg portion of each L-shaped section extending horizontally. This embodiment offers the advantage that the height of the yoke member and, consequently, the height of the weighing apparatus, may be greatly reduced. In another embodiment, the yoke member is arranged with its longitudinal axis extending vertically, the leg portions of the L-shaped sections extending vertically.

Preferably there are attached on the inside of at least one of the identical parts a pair of identical, flat permanent magnets in such a manner that their magnetic fields will extend in opposite directions. This affords a better field than by the use of a single permanent magnet having segments which are magnetized in opposite directions. For various types of scales, depending upon the requirements, use may be made, for example, of two or four of the same permanent magnets. It is a good idea to make the arrangement in such a manner that the two permanent magnets arranged under each other, will touch each other. In this way, a further simplification is achieved during assembly (since it is not necessary to maintain a defined interval between the individual permanent magnets) and furthermore, this helps in obtaining lower structural height.

BRIEF DESCRIPTION OF THE DRAWING

Other objects and advantages of the invention will become apparent from a study of the following specification when viewed in the light of the accompanying drawing, in which:

FIG. 1 is a detailed longitudinal sectional view of the weighing apparatus of the present invention taken along line 1—1 of FIG. 2;

FIG. 2 is a detailed top plan view of the weighing apparatus;

DETAILED DESCRIPTION

Figures 3, 4:
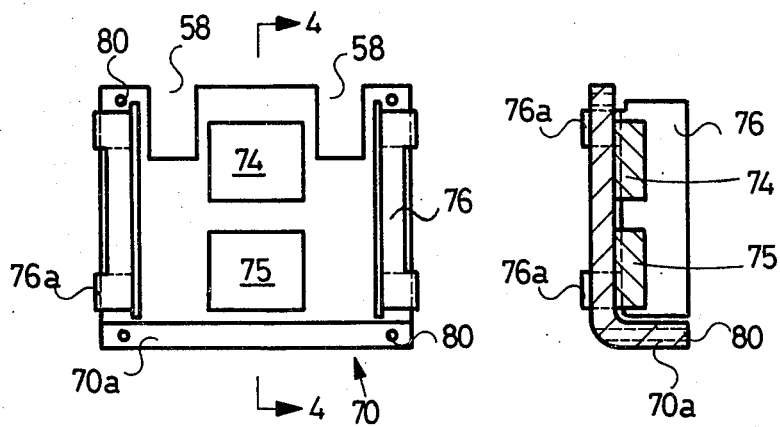
FIG. 3 is an elevational view of one of the L-shaped yoke sections of FIG. 2.
FIG. 4 is a sectional view taken along the line 4—4 of FIG. 3.

Referring first more particularly to FIGS. 1 and 2, the weighing apparatus is of the electromagnetic load compensation type having a top-pan scale with a load receiver connected for parallel guidance, certain parts having been omitted for clarity.

The apparatus includes a die-cast metal housing 10 having bottom, side and rear walls 12, 14 and 16, respectively. Integrally cast with the bottom wall 12 is a vertical rib 18 having in plan view a generally U-shaped configuration. The rear wall 16 is provided on its inner surface with a pair of inwardly projecting bearing blocks 20 (FIG. 2) arranged symmetrically on opposite sides of the longitudinal axis of the housing, said bearing blocks each having horizontal upper and lower support surfaces 22.

Upper and lower generally T-shaped guide plates 28a and 28b are connected at their arm portions by resilient bearings 24a and bolts 25 with the upper and lower support surfaces 22 of the bearing blocks 20, respectively. The stem portions of the upper and lower light metal guide plates 28a and 28b are connected by a pair of flexible bearings 24b and bolts 26 with the upper and lower ends (33 and 34, respectively) of the vertically movable hollow frame-shaped load carrier member 30 the upper portion of which carries the scale pan pin 32 that supports the central portion of a scale pan P. The upper and lower guide plates 28a and 28b thus serve as part of a parallelogram guidance system for guiding the vertically displaceable load carrier member 30.

The load carrier member 30 includes a horizontally extending cross-bar portion 30a that is suspended from central lug portion 36a of a two-arm lever 36 by resilient bearing 46 and bolts 48. Intermediate its ends, the lever 36 has a body portion 36b that is connected for pivotal movement relative to the vertical housing rib 18 by a pair of vertical flexible bearings 38 and bolts 40. At its right hand end, the two-armed lever 36 includes a fork-shaped portion 52 defining a pair of parallel spaced horizontal longitudinal extensions 36c that extend through a pair of openings 58, respectively, contained in one wall of a sectional hollow open-ended soft iron yoke member 69. The extensions terminate in downwardly depending portions 36d to which are bolted by bolts 50 the angular wing portions 54a of a compensation coil assembly 54 including a pair of copper sheet metal discs between which is mounted the annular coil.

The two-armed lever 36 also carries a downwardly depending vane portion 60 that is arranged for movement within the light path of a stationary photocell motion detecting system including a photoelectric transmitter 62 and photoelectric detector 64 mounted on the housing bottom wall. As is known in the art, the photoelectric position sensing system is operable to produce a position responsive load signal that is supplied to the compensating current generating means to produce compensating current that is supplied to the compensation coil 54 to restore the load carrier member 30 to its initial no-load position, the magnitude of the compensating current being a function of the applied load as indicated by the visual weight indicating means 65.

In accordance with the present invention, the soft iron yoke member 69 of the permanent magnet system is attached to the rear wall 16 of the housing by spacer sleeves 66 and bolts 68, and to the bottom wall 12 of the housing by spacer sleeves 56 and bolts 57. The yoke is formed from a pair of L-shaped sections 70, 71 arranged to define a hollow open-ended box. In the embodiment of FIGS. 1-4, the yoke is arranged horizontally, the shorter legs 70a and 71a of the sections extending horizontally, and the longer shank portions extending vertically. At its upper end, the longer shank portion of section 70 contains a pair of horizontally-spaced vertical slots 58 that define the openings in the yoke member through which the fork extensions 36C of the lever 36 extend. Symmetrically arranged on opposite sides of the axis of the compensation coil 54—when the coil is in the no-load position—are a pair of flat magnets 74 and 75 that are adhesively secured to the inner vertical wall surface of the yoke member defined by yoke section 70. The flat permanent magnets are magnetized in opposite directions normal to the yoke wall surface upon which they are mounted, whereby the resultant force direction of the upper and lower parts of coil 54 in the magnetic field is identical.

During assembly, the short leg portion 70a of yoke section 70 is bolted to the housing bottom wall 12 by bolts 57, whereupon the yoke extensions 36c of lever 36 are inserted in the slots 58, respectively, whereby the compensation coil that is carried by the lever portions 36d is between the yoke section 70 and the rear wall 16. The second section 71 is then bolted to rear wall 16 by bolts 68. If desired, use may be made of removable yoke section guide members 76 (FIGS. 3 and 4) having angularly arranged resilient wing portions 76a that are removably connected with the vertical edges of the yoke section 70, thereby to guide the second yoke section 71, during assembly, to the assembled position of FIG. 1, whereupon the bolts 68 are initially screwed into corresponding threaded bores 80 contained in the yoke section 70. The guide members 76 are then removed, whereupon the bolts 68 are tightened to rigidly mount the yoke sections 70, 71 to the housing.

Figures 5, 6:
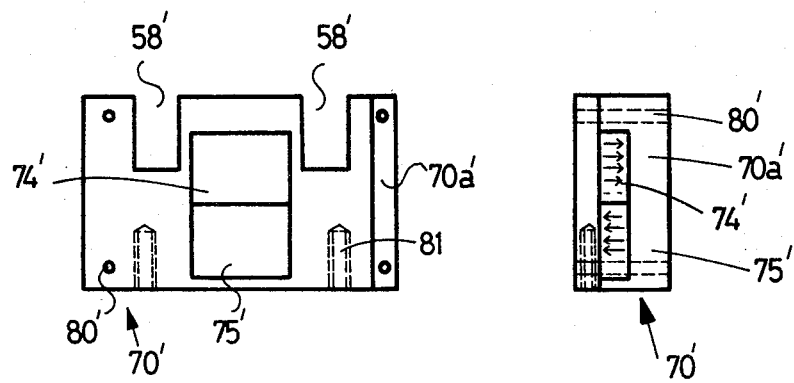
FIG. 5 is an elevational view of a second embodiment of L-shaped yoke section.
FIG. 6 is a left hand end view of the yoke section of FIG. 5.

Referring now to the embodiment of FIGS. 5 and 6, in the event that the yoke member is to be mounted with its longitudinal axis extending vertically, use is made of yoke sections in which both the longer shank portions and the shorter leg portions are arranged vertically. Thus, the yoke section 70' has a longer shank portion to which the upper and lower permanent magnets 74' and 75' are adhesively secured, the magnets being in contiguous engagement for ease of assembly on the inner wall surface of yoke section 70'. The shorter leg portion 70a' extends vertically in this embodiment, certain of the screw threaded bore holes 80' being contained in this leg portion. Tap holes 81 provided in the shank portion of the yoke section 70' cooperate with spacer sleeves 56 and bolts 57 to maintain the lower end of the yoke member in spaced relation above the housing bottom wall 12.

This arrangement makes it possible for us to omit, during assembly, the guide angle pieces 76 of FIGS. 3 and 4. When inserting the outer L-sheet metal piece 70', the two short shanks 70'b are used for mutual guidance until the illustrated desired assembled position is reached.

The two permanent magnets 74 and 75 are secured in abutting relation upon the shank portion of the interior L-sheet metal piece 70', thereby producing a further saving in structural height. The arrows in FIG. 6 indicate the course of the magnetic field which again runs in opposite directions.

Here, and in the earlier example, we can provide, for the purpose of increasing the force effect, instead of the two permanent magnets 74', 75', for example, four such permanent magnets, preferably two, each, on each of the L-sheet metal pieces 70' or 71' whose shorter legs 70a', 71' will then have to be made longer accordingly.

Usually the arrangement is so made that the compensation coil and the permanent magnets extend vertically (the useful magnetic field portions extending horizontally). However, other designs (with force diversion) might be provided where, for example, the coils and the magnets are arranged horizontally (useful magnetic field running in vertical direction).

In most cases, as in the above examples, we have a lever for force transmission; in other cases, especially in the case of low-load scales, the coil can also be attached directly to the load receiver.

The design of the permanent magnet system according to the invention is not confined to top-pan scales according to the examples but can basically also be used for below-pan scales.

While, in accordance with the provisions of the Patent Statutes, the preferred forms and embodiments have been illustrated and described, other changes and modifications may be made without deviating from the inventive concepts set forth above.

What is claimed is:

1. Weighing apparatus of the electromagnetic load compensation type, including a housing (10), a load receiving member (30) connected for vertical movement relative to said housing, means connected with the housing for establishing a stationary permanent magnetic field, and compensation circuit means including a coil (54) connected with said load receiving member for movement in said magnetic field;

the improvement wherein said field establishing means comprises (a) a hollow sectional open-ended soft iron yoke member (69) having in transverse cross-section a generally rectangular cross-sectional configuration, said yoke member comprising an assembly of a pair of generally identical L-shaped sections (70, 71) that extend longitudinally the length of said yoke member; and (b) at least one flat permanent magnetic member (74) connected with said yoke member for establishing a flow of magnetic flux therein.

2. Apparatus as defined in claim 1, wherein said yoke member (69) is arranged with its longitudinal axis extending horizontally, whereby said yoke member is open at opposite ends.

3. Apparatus as defined in claim 1, wherein said yoke member (69') arranged with its longitudinal axis extending vertically, whereby said yoke member is open at its upper and lower ends.

4. Apparatus as defined in claim 1, wherein a pair of said flat permanent magnets (74, 75) are mounted in parallel horizontal superposed relation within said yoke member on one inner wall surface thereof, said permanent magnets being magnetized oppositely relative to each other to produce magnetic fields that extend in opposite directions.

5. Apparatus as defined in claim 4, wherein said permanent magnets are mounted in contiguous relation.

6. Apparatus as defined in claim 4, wherein each of said permanent magnets is magnetized in a direction normal to said yoke member inner wall surface.

* * * * *